United States Patent [19]

Steffero, Sr.

[11] Patent Number: 5,006,240
[45] Date of Patent: Apr. 9, 1991

[54] WATER-TREATMENT SYSTEM

[75] Inventor: Robert F. Steffero, Sr., Myrtle Beach, S.C.

[73] Assignee: Aqua Systems Division of Chem-Free, Inc., Kennesaw, Ga.

[21] Appl. No.: 475,765

[22] Filed: Feb. 6, 1990

[51] Int. Cl.$^5$ .................. B01D 35/06; C02F 1/48
[52] U.S. Cl. ................... 210/223; 210/195.1; 210/196; 210/197; 210/259; 210/274; 210/275; 210/277; 210/290; 210/222; 422/139
[58] Field of Search .............. 210/140, 195.1, 196, 210/197, 223, 239, 274, 275, 277, 279, 290, 222, 257.1, 805; 422/139

[56] References Cited

U.S. PATENT DOCUMENTS 4,485,012 11/1984 Ehresmann .................. 210/223

Primary Examiner—Robert A. Dawson
Assistant Examiner—David Reifsnyder
Attorney, Agent, or Firm—Hopgood, Calimafde, Kalil, Blaustein & Judlowe

[57] ABSTRACT

The invention contemplates a water-treatment system wherein inlet water is subjected to continuous circulation, or at least to a plurality of cycles of circulation, in a loop wherein air under pressure is injected into the water prior to passage through a magnetic-energy treatment device. The recirculation involves a tank which thus provides a volume of available pretreated water, against which to drawn in accordance with intermittent demand. Magnetic-field treatment of the aerated water creates particulates, from oxidizable impurities such as iron, and these particulates are separable by filtration; and as to those impurities as involve dissolved gases, such as radon or hydrogen sulfide, the gases are driven from solution and vented (along with excess air) external to the treated-water outlet of the system. A backwash feature of the filtration part of the system enables solid-matter accumulations to be flushed out and drain periodically, in a short automated periodic cycle of filter reconditioning, preferably at a night-time hour of minimum demand.

11 Claims, 3 Drawing Sheets

WATER-TREATMENT SYSTEM

BACKGROUND OF THE INVENTION

The invention relates to the art of treating water supplies, as for human consumption, for industrial processes, and/or for commercial buildings.

In the art of treating water supplies, various types of water conditioners and filters are well known. The problem is that such devices require ion exchanges. The filters require frequent cartridge changes, and the involved labor adds to the cost. In many cases, poisonous chemicals are introduced to control iron content. Hydrogen sulfide smells like rotten eggs; when present as a contaminant, attempts are made to remove it entirely, but these attempts generally fail, due to poor system design. Further, present techniques for treatment of the hydrogen sulfide permit growth of sulfur bacteria, which begin to grow at or about 56° F. Treated water in known systems is allowed to collect in an open tank, thereby subjecting the treated product to ambient conditions, i.e., to non-controllable conditions. Present-day water systems cannot prevent the occurrence of such sulfur bacteria, and, once bacteria form, the poisonous chemical chlorine is introduced to kill the bacteria.

BRIEF STATEMENT OF THE INVENTION

It is the primary object to provide an improved water-treatment method and means to produce a clean drinkable supply, whether on a limited residential-use basis, or for larger-scale commercial or industrial use.

Another object is to achieve the foregoing object without resorting to use of dangerous chemicals or salts.

Still another object is to provide a method and means for removing odors from ground waters, where such odors are natural contaminants, such as hydrogen sulfide, iron and organic matter, indigenous to the local water supply.

A further object is to meet the above objects with a water-treatment system which is self-cleansing and which requires no structural changes, such as cartridge substitution and/or replacement, over prolonged periods of use.

The invention achieves these objects by providing a water-treatment system wherein inlet water is subjected to continuous circulation, or at least to a plurality of cycles of circulation, in a loop wherein air under pressure is injected into the water prior to passage through a magnetic-energy treatment device. The recirculation involves a tank which thus provides a volume of available pretreated water, against which to draw in accordance with intermittent demand. Magnetic-field treatment of the aerated water creates particulates, from oxidizable impurities such as iron, and these particulates are separable by filtration; and as to those impurities as involve dissolved gases, such as radon or hydrogen sulfide, the gases are driven from solution and vented (along with excess air) external to the treated-water outlet of the system. A backwash feature of the filtration part of the system enables solid-matter accumulations to be flushed out and drained periodically, in a short automated periodic cycle of filter reconditioning, preferably at a night-time hour of minimum demand.

DETAILED DESCRIPTION

The invention will be described in detail for preferred embodiments, in conjunction with the accompanying drawings, in which.

Figure 1:
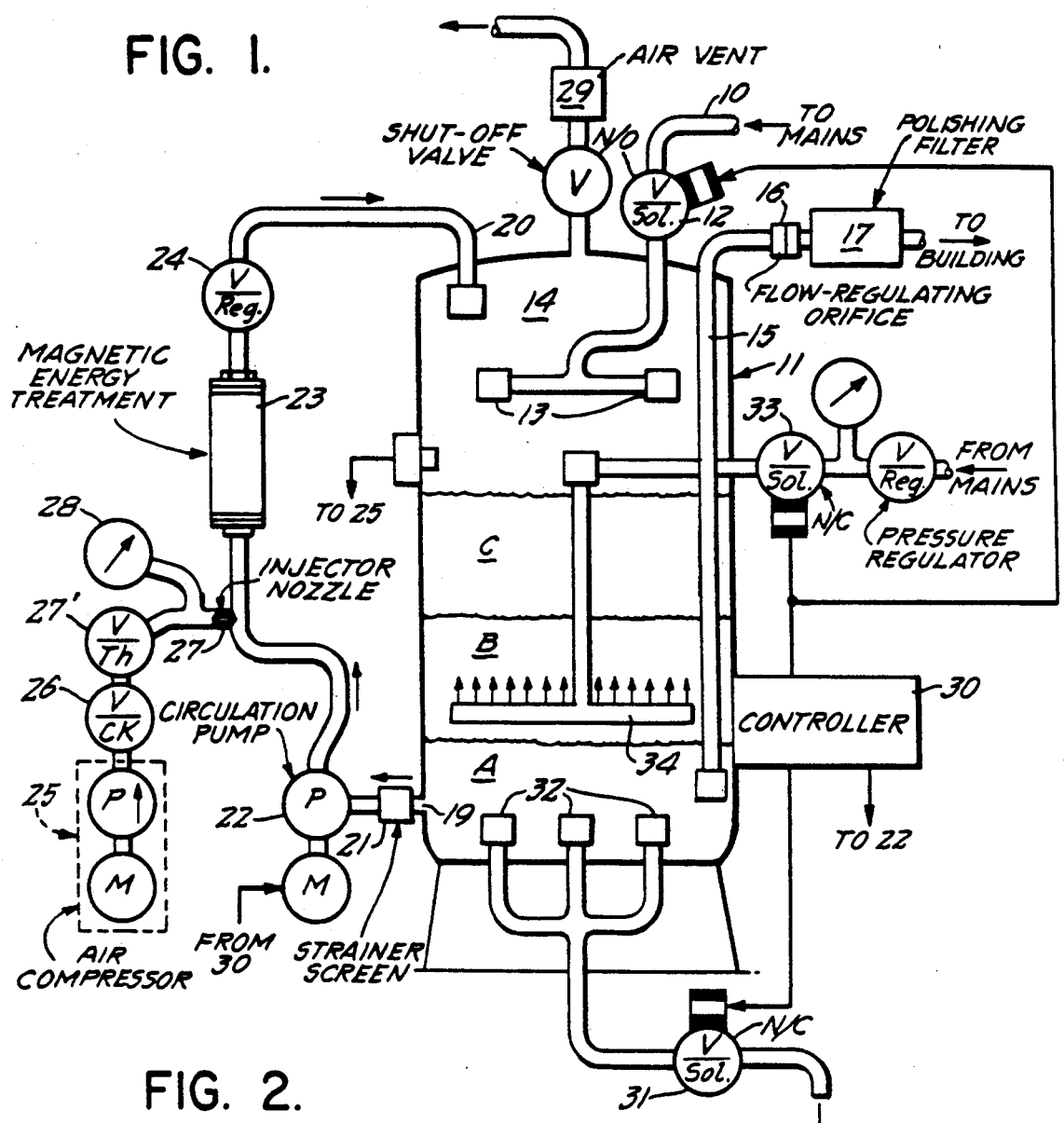
FIG. 1 is a simplified diagram schematically showing a water-treatment system of the invention, particularly for use with inlet water from a municipal supply.

In the system of FIG. 1, water from a municipal-mains supply 10 enters a tank 11 via a normally-open solenoid valve 12. The incoming water discharges via a diffuser complex of plural strainers 13 into the lower half of the upper region 14 of the tank. This upper region will be understood to be full of treated water, under mains pressure, and available for use pursuant to demand, via an outlet line 15, shown via a flow-regulating orifice 16 and a polishing filter 17; line 15 will be seen to draw treated water from the lowermost region A of the tank. The building supplied from line 15 may be a single residence, an apartment building, or an industrial or commercial facility, and the size of tank 11 may be various, e.g., from 100-gallon to 1200-gallon capacity, depending upon the required use.

Generally speaking, the upper region 14 may be the upper third or forty percent of the volume within tank 11; the remaining two thirds is schematically shown to be committed to a filter bed, designated with three strata A, B, C of progressive filtering materials. These strata are of substantially equal volume; and a present preference is indicated that the lower stratum A be a graded washed gravel (e.g., $\frac{1}{4}'' \times 3/8''$), that the intermediate stratum B be a filter-aggregate product of Mattson Chemical Company, Inc. having a micron-retention size of 25 microns, and that the upper stratum C be a so-called birm, a product of Flint and Wallen (Kendalville, Ind.) having a micron-retention size of 15 to 20 microns.

In accordance with the invention, the water within tank 11 is continuously moving in a recirculation pretreatment loop which involves downward flow through the filter-bed strata C, B, A, with exit at a lower port connection 19 to external components of the loop, and return at port 20 to the treated-water upper half of the upper region 14 of the tank. The external components of the pre-treatment loop are seen to comprise a strainer screen 21, a motor-driven circulation pump 22, a magnetic-energy treatment device 23 and a flow regulator 24. And a motor-driven oil-less air compressor 25 delivers compressed air to the circulation inlet to device 23 via a check valve 26, an adjustable throttle 27', and an injector-nozzle connection 27, while a gage 28 certifies injection pressure of air to nozzle 27.

The detail of construction of the magnetic-energy treatment device 23 is not part of the invention and therefore need not be described, being the subject of U.S. Pat. No. 4,366,053 and commercially available from Descal-A-Matic Corporation, of Norfolk, Va., as a "fluids conditioner" under the tradename Descal-A-Matic, wherein the heart of the device is referred to as the "Magne-Core". It suffices to state that, as its name implies, the commercially available device is promoted for its ability to prevent or remove scale, and to prevent corrosion, as in boilers and heating systems. As the mineral content in the water flows through alternating magnetic force in the "Magne-Core", valence electrons are affected and lose their innate combining ability to form hard scale. Minerals are rendered into a soft mud which, in the presently described system accumulates in the relatively low-velocity filter-bed region of the recirculating flow promoted by pump 22. And, by reason of the indicated injection of air via nozzle 27, minerals such as iron are oxidized and removed as finely divided rust or the like components of the soft mud accumulation in the filter bed. Additionally, the injection of air, and air-charged water passage via the treatment device 23 means that air must be vented from the top of the system, here shown as an air vent 29 connected to the top center of tank 11.

The mud accumulations in the filter bed must be periodically removed to keep the system in effectively continuous operating condition. This is readily and advisedly performed at an off-peak hour such as two or three a.m. The removal of filter accumulations is shown to be effected automatically pursuant to the simple timing program of a controller 30, shown mounted to the side of tank 11. Controller 30 is connected to operate at least three solenoid valves for the relative short period of each filter-reconditioning operation. These solenoid valves are: the normally-open valve 12, whereby inlet water from the mains to the upper part of tank 11 is temporarily shut off; a normally-closed drain valve 31, whereby plural drain heads 32 in the gravel stratum A become available to externally pass a drainage flow; and a normally-closed flushing valve 33 which opens to admit a backwashing flow from the mains to a bed-lifting upwardly discharging spray head 34 positioned near the bottom of the intermediate region B of the filter bed. The action is to supply an upwardly discharging pressure regulated flow direct from the mains to the accumulations in regions B and C of the filter bed while concurrently draining the mud-laden water contents of the filter bed.

Generally speaking, the daily accumulation of mud-like products in the filter bed will not be great, and therefore there is no harm in leaving the circulation pump in its continuously operating state. However, if mains pollution is excessive, it will be understood that controller 30 may be additionally connected to temporarily shut down pump 22 during the backwashing phase of operation. To this end, schematic connection from the controller to the circulation pump is suggested by arrows in FIG. 1 labelled "to 22" and "from 30", respectively.

Figure 2:
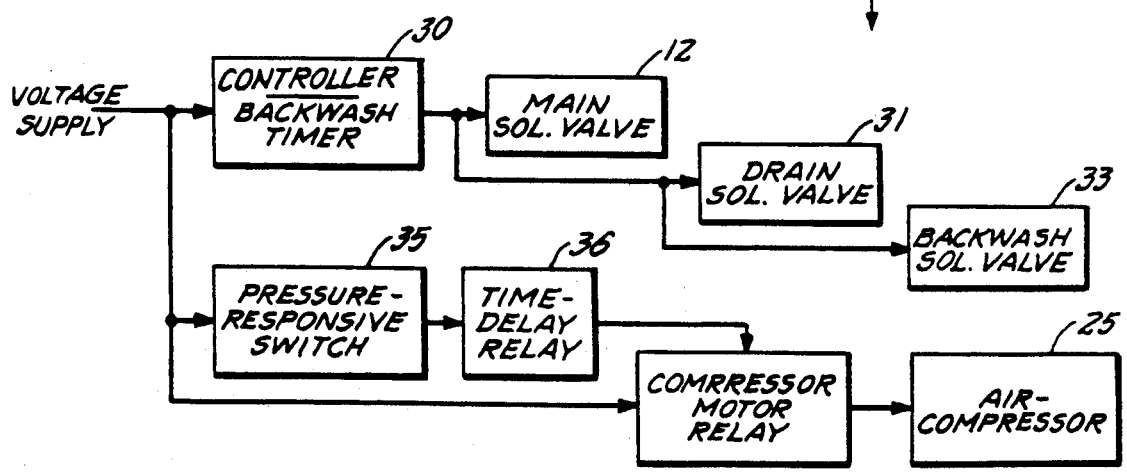
FIG. 2 is an electrical block diagram, schematically showing control connection for the arrangement of FIG. 1.

In a single-household use of the system of FIG. 1, the maximum flow rate for supply at 10 and delivery via outlet 15 will be in the range of 5 to 12 gallons per minute, in which case the capacity of tank 11 may suitably be 24 gallons, i.e., 18 inches diameter by 24 inches in height. The municipal water supply may be in the range 60 to 80 psi, and it is recommended that the pressure of air to nozzle 27 be set for substantially 5 psi above the water-supply pressure. Preferably, the air compressor 25 includes a pressure-sensing on/off control switch 35 whereby the air compressor only operates in response to a reduction in water pressure, as when a household usage transiently reduces the water pressure; in FIG. 2, a time delay relay 36 is shown to provide a short time delay in the start of the air compressor, following switch 35 detection of the onset of a water-use demand. Also, for household use, there is no need to keep the recirculation flow operative at all times, and therefore it will be understood that both the recirculation flow of water and the injection of compressed air may be limited essentially only to demand intervals. Illustratively, the air vent 29 should handle a discharge of 3.7 scfm, in the situation of compressed-air delivery via nozzle 27 at a maximum rate of 1.8 scfm.

On the other hand, in multiple-dwelling use of the system of FIG. 1, as for example in a 50-unit apartment complex, it is desirable to keep the aerating and recirculating functions in continuous operation, subject only to the short backwashing function performed automatically in the dead of night. In an apartment complex of this size, a typical maximum demand flow can be 200 gallons per minute, in which case a standard 315-gallon tank (4-ft. diam., 8-ft. height) will suffice. The FIG. 1 labels "To 22" and "From 30" will be understood to suggest the feature of controller 30 shutting down the recirculation pump 22 during a backwashing phase. The air-vent discharge capacity at 29 can be in the magnitude of 40 scfm. for the apartment complex, or less, e.g., in the range 10-20 scfm. for a modest industrial user.

Figure 3:
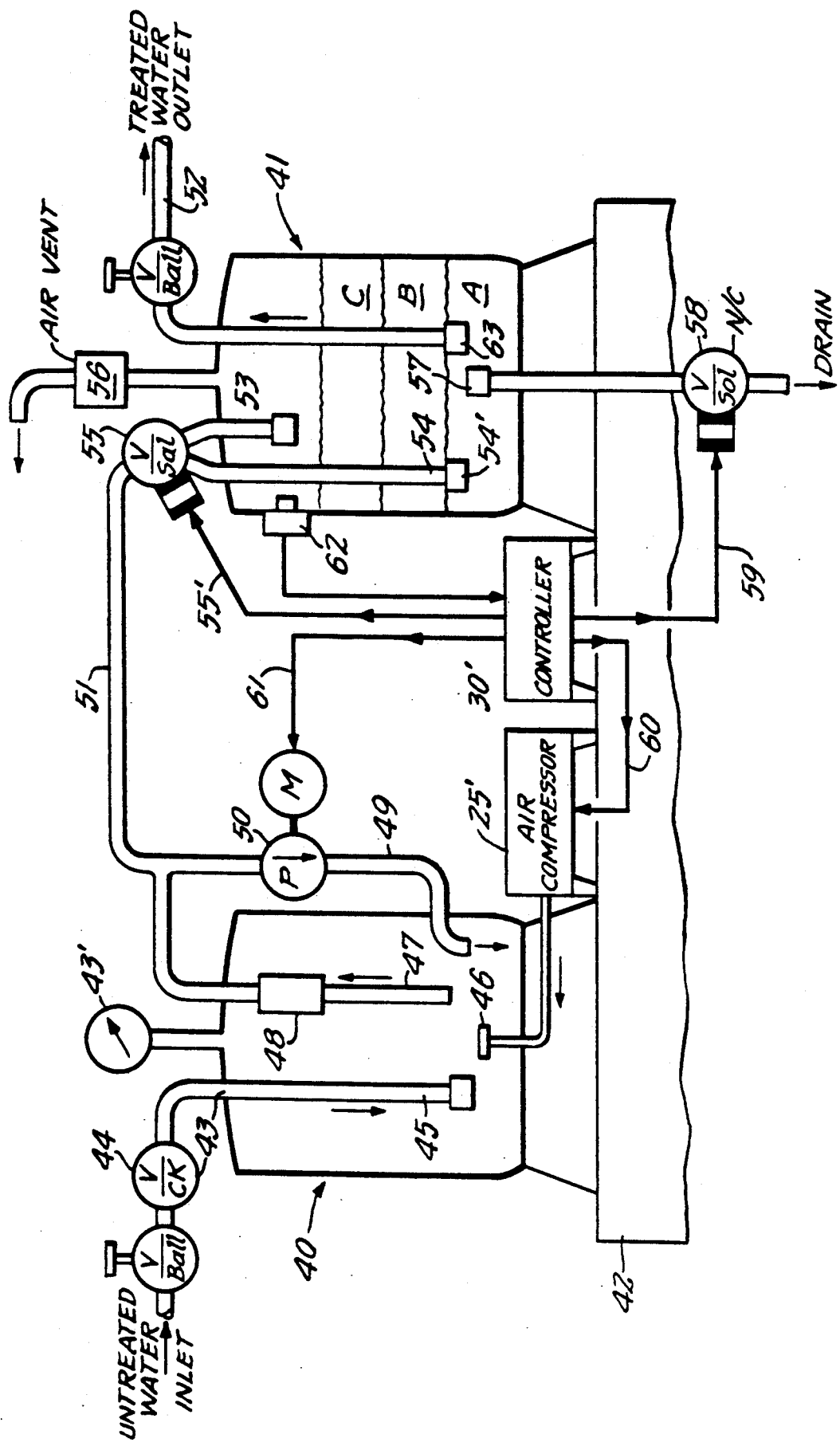
FIG. 3 is a system diagram similar to FIG. 1 for a water-treatment system which relies upon periodic pumping from a local well, as for supply of a single residential dwelling.

The arrangement of FIG. 3 represents modification from FIG. 1 in two general respects: although it may be used with a municipal-mains supply, it is designed primarily for application to a locally pumped water supply, and it separates the magnetic-energy treatment of aerated inlet water in a first tank 40, from filter-bed accumulation of mud-like solids in a second tank 41. Both tanks are shown mounted to the same base slab 42, which also mounts an air compressor 25' and a controller 30' of the general nature described in support of the FIG. 1 arrangement.

More specifically, inlet water, which may range in pressure between limits customary in a household well-pumping operation (e.g. cyclical pump-starting at 20 psi and pump shut-off at 40 psi) enters tank 40 via an inlet port 43 that is protected by a check valve 44 for unidirectional flow, via a pipe 45 and strainer, into a lower region of tank 40, with provision for pressure indication at 43'. A spray head or nozzle 46 near the bottom of the tank introduces air under pressure from compressor 25'; and aerated water in the tank is circulated in a loop which is shown to comprise an outlet pipe 47, a magnetic-energy treatment device 48, an external return pipe 49, and a motor-driven pump 50. A supply of magnetically processed aerated water is thus available in the volume of tank 40, in readiness to be drawn off in a connecting line 51 to tank 41, upon user demand at outlet 52 for the product of filtration in tank 41.

At the filtration tank 41, separate inlets 53, 54 are shown to the upper and lower regions of the tank, and a solenoid-operated selector valve 55 determines which of these inlets will be supplied by treated water in line 51. The solenoid of valve 55 has a control connection 55' to controller 30', and the nature of connections is preferably such that in its normal (i.e., electrically unactuated) condition, valve 55 connects line 51 to the upper-region inlet pipe 53, for discharge above previously described filter strata C, B, A; on the other hand, when valve 55 is electrically actuated, line 51 is connected to supply the lower-region inlet pipe 54. Description of plumbing connections to tank 41 is completed by identifying an air vent 56; and a backwashing drain system comprises a strainer inlet 57 within the washed-gravel stratum A, with a normally closed solenoid valve 58 having electrical connection 59 to controller 30'.

If desired, the aeration and recirculation functions provided by compressor 25' and pump 50 may be continuously operated. However, it is more economical, for the generally spasmodic or intermittent demands of a household water system, to have controller 30' determine the use of these pumps more as a function of demand. Thus, recirculation in line 49 to tank 40 may continue to operate upon the contents of tank 40 until a timer within the controller 30' shuts off the air compressor 25' and pump 50, with these devices remaining shut off until household demand calls for delivery of aerated and filtered water, via the outlet connection 52 of tank 41. Separate electric connections 60/61 are shown from controller 30', for such shut off of the air compressor 25' and of the recirculation pump 50; and a demand sensor, such as a pressure-responsive switch 62 in tank 41, is shown with connection to controller 30', for reinstituting the aeration and magnetic-treatment functions within tank 40, upon onset of a sensed demand.

It will be seen that in the FIG. 3 arrangement, the action of the described filter-bed strata is to accommodate the magnetically treated aerated water from tank 40, in a progressively downward flow through the strata C, B, A, such flow occurring only on demand, with fully treated and filtered water being taken from the lower most, washed-gravel stratum A, and via inlet-strainer connection 63 to the outlet-pipe connection 52, and with air and gases extracted in the treatment process being vented at 56 from the top center of tank 41, as in the case of the system of FIG. 1.

For backwashing the filter bed of FIG. 3, the strainer 57 will be understood to schematically indicate a lower-region system of plural drain ports as in FIG. 1, all served by the single normally closed solenoid valve 58. Concurrent with a drain-open condition at 58, controller 30' actuates valve 55 to divert inlet water flow from line 51 to a lower level via pipe 54, it being understood that the strainer outlet shown at 54' is a schematic indication of a bed-lifting upwardly discharging array as at 34 in FIG. 1. Cleansing of accumulations within the filter bed of FIG. 3 is thus analogous to the operation of FIG. 1, except that magnetically processed aerated water is used for the purpose, in the system of FIG. 3.

Since the two-tank system of FIG. 3 is indicated to be suitable for household use, with dependence upon a local source of pumped water, it is, for example, suitable to use 24-gallon tanks at 40 and 41.

Figure 4:
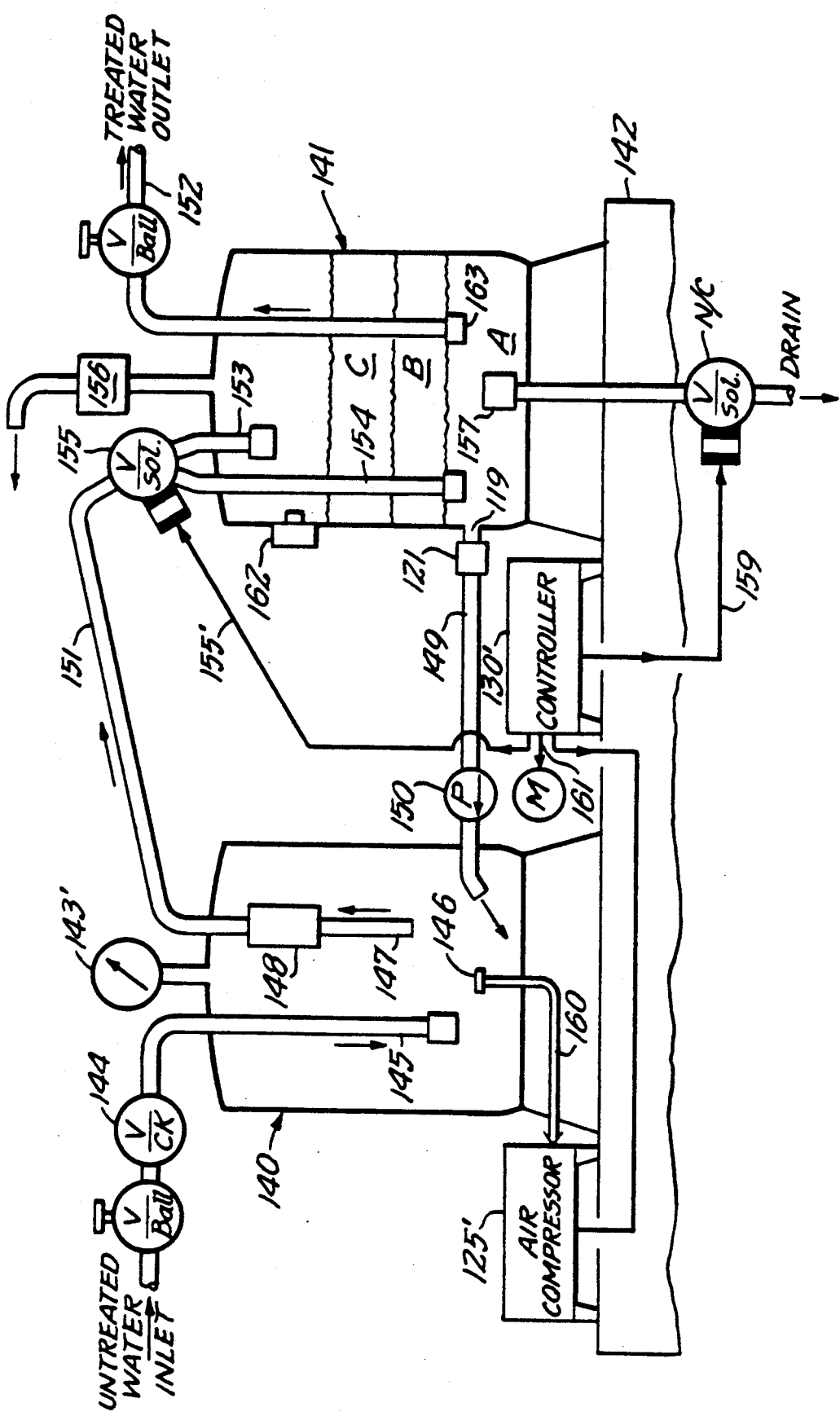
FIG. 4 is another similar diagram, for a system modified from that of FIG. 3.

FIG. 4 further shows another two-tank system, closely similar to the FIG. 3 system, but differing primarily in the fact that the recirculation part of the system also incorporates filter-bed action in the recirculation loop, thus providing greater equivalency to the FIG. 1 system, at least in this respect. Components of FIG. 4 which correspond to those of FIG. 1 and FIG. 3 are given the same reference numbers, in a 100 series, and these need not be further described. The point of difference in respect of recirculation is that this occurs by establishing a circulation-return line 149 between a lower port connection 119 to tank 141, via a strainer 121 and pump 150 to a lower port of tank 140. All other delivery and backwashing functions and connection remain as previously described.

What is claimed is:

1. A water-treatment system, comprising a tank having a lower filter-bed region and an upper region above said filter-bed region, a water-inlet connection to said upper region for admission of untreated water under delivery pressure, a circulation loop for conveying water from said lower region for discharge into the upper region of said tank, and a water-outlet connection from the lower region of said tank for external delivery of treated water; said circulation loop including in series a continuously running circulation pump, an air-admission connection and a magnetic-energy treatment device, and air-compressor means for delivering air through said air-admission connection to the flow of water in said loop prior to passage through said magnetic-energy treatment devices; and air-venting means above said water-outlet connection for venting air from said tank, whereby airborne oxygen is continuously exposed to recirculating water for oxidation of impurities to a state capable of magnetic-energy treatment to enhance impurity coagulation with density greater than unity, further whereby coagulated impurities will enable enhanced filter-bed accumulation of impurities; and a backwashing system comprising means to intermittently circulate upwardly directed flows of inlet water within a lower region of said filter-bed, whereby to dislodge and suspend filter-bed accumulations, and means including a selectively operable drain valve connected to the lower region of said tank for discharge of water with suspended accumulations from within said lower region of the filter-bed at least as long as inlet water is being admitted to the lower region of the filter bed.

2. The water-treatment system of claim 1, in which said circulation loop is via an external treatment zone which includes said air-admission connection and said magnetic-energy device.

3. The water-treatment system of claim 1, in which said drain valve is solenoid-operated, and in which control means including a timer is connected for periodic operation of said valve.

4. A water-treatment system comprising first and second tanks, a water-inlet connection to said first tank, a water-outlet connection from a lower region of said first tank and including a magnetic-energy treatment device, an air-admission device at the lower region of said first tank and air-compressor means to deliver air under pressure via said air-admission device, and a recirculation loop including a pump having an inlet connection to said outlet pipe and an outlet connection to the lower region of said tank; a filter bed in said second tank, a selector valve with an inlet connection to the outlet connection of said first tank and selectively operable in a normal-use state of said system to determine a first inlet-flow connection to the upper region of said second tank and in another state to determine a second inlet-flow connection to the lower region of said tank, and a water-outlet connection from the lower region of said tank; and a backwashing system comprising means to intermittently actuate said valve to said other state, whereby to dislodge and suspend filter-bed accumulations, and means including a selectively operable drain valve connected to the lower region of said second tank for discharge of water with suspended accumulations from the lower region of said filter bed.

5. A water-treatment system comprising first and second tanks, a water-inlet connection to said first tank, a water-outlet connection from a lower region of said first tank and including a magnetic-energy treatment device, an air admission device at the lower region of said first tank and air-compressor means to deliver air under pressure via said air-admission device, a filter bed in said second tank, a selector valve with an inlet connection to the outlet connection of said first tank and selectively operable in a normal-use state of said system to determine a first inlet-flow connection to the upper region of said second tank and in another state to determine a second inlet-flow connection to the lower region of said second tank, a first water-outlet connection from the lower region of said second tank, a recirculating loop comprising a second water-outlet connection from the lower region of said second tank and a pump connected to discharge water from the lower region of said second tank into the lower region of said first tank; and a backwashing system comprising means to intermittently actuate said valve to said other state, whereby to dislodge and suspend filter-bed accumulations, and means including a selectively operable drain valve connected to the lower region of said second tank for discharge of water with suspended accumulations from the lower region of said filter bed.

6. The water-treatment system of claim 4 or claim 5, in which said selector valve and said drain valve are each solenoid-operated, and in which control means including a timer is connected for periodic concurrent operation of both said valves.

7. The water-treatment system of claim 1 or claim 4 or claim 5, wherein said filter-bed comprises at least two vertically arrayed regions of filtering capability wherein the lower region is of graded and washed gravel.

8. The water-treatment system of claim 1 or claim 4 or claim 5, wherein said filter-bed comprises at least three vertically arrayed regions of filtering capability, wherein the lower region is of graded and washed gravel, and wherein intermediate and upper filter-bed regions are of progressively finer filtering capability.

9. The water-treatment system of claim 1 or claim 4 or claim 5, in which the lower region of said filter bed is of graded and washed gravel, in the fineness range of ¼ by ⅜-inch size.

10. The water-treatment system of claim 1 or claim 4 or claim 5, in which said filter bed includes an intermediate filter-bed region comprising washed aggregate of micron-retention size in the range of substantially 20 to 30 microns.

11. The water-treatment system of claim 1 or claim 4 or claim 5, in which said filter bed includes an intermediate filter-bed region comprising washed aggregate of micron-retention size in the range of substantially 20 to 30 microns, said filter bed including an upper filter-bed region comprising washed aggregate of micron-retention size in the range of substantially 10 to 20 microns.

* * * * *